United States Patent
Kostic et al.

(10) Patent No.: US 10,513,917 B2
(45) Date of Patent: Dec. 24, 2019

(54) METHOD FOR FRACTURING A FORMATION

(71) Applicant: Halliburton Energy Services, Inc., Houston, TX (US)

(72) Inventors: Nebojsa Kostic, Houston, TX (US); Eric Bivens, Littleton, CO (US); Loyd E. East, Jr., Telephone, TX (US); Ronald G. Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/767,764

(22) PCT Filed: Nov. 12, 2015

(86) PCT No.: PCT/US2015/060431
§ 371 (c)(1),
(2) Date: Apr. 12, 2018

(87) PCT Pub. No.: WO2017/082916
PCT Pub. Date: May 18, 2017

(65) Prior Publication Data
US 2018/0298740 A1    Oct. 18, 2018

(51) Int. Cl.
*E21B 43/26*     (2006.01)
*C09K 8/80*      (2006.01)
*C09K 8/68*      (2006.01)
*E21B 43/267*    (2006.01)
(Continued)

(52) U.S. Cl.
CPC .............. *E21B 43/267* (2013.01); *C09K 8/68* (2013.01); *C09K 8/685* (2013.01); *C09K 8/80* (2013.01); *E21B 43/114* (2013.01); *E21B 43/116* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 6,394,184 B2 * | 5/2002 | Tolman | E21B 17/203 166/120 |
| 7,273,099 B2 | 9/2007 | East, Jr. et al. | |
| 7,296,625 B2 | 11/2007 | East, Jr. et al. | |

(Continued)

FOREIGN PATENT DOCUMENTS

| | | |
|---|---|---|
| WO | 2015041690 A1 | 3/2015 |
| WO | 2015105488 A1 | 7/2015 |

OTHER PUBLICATIONS

International Search Report and the Written Opinion for International Application No. PCT/US2015/060431 dated Aug. 2, 2016, 12 pages.

(Continued)

*Primary Examiner* — Anuradha Ahuja
(74) *Attorney, Agent, or Firm* — Chamberlain Hrdlicka

(57) ABSTRACT

A method of fracturing a formation penetrated by a wellbore, the method includes fracturing the formation by increasing an annulus pressure in the wellbore above a fracture initiation pressure. The method also includes decreasing the annulus pressure below a fracture closure pressure, and re-fracturing the formation by increasing the annulus pressure in the wellbore above the fracture initiation pressure.

18 Claims, 5 Drawing Sheets

(51) Int. Cl.
  *E21B 43/114* (2006.01)
  *E21B 43/116* (2006.01)

(56) References Cited

U.S. PATENT DOCUMENTS

| | | | |
|---|---|---|---|
| 7,478,676 B2 | 1/2009 | East, Jr. et al. | |
| 7,580,796 B2 | 8/2009 | Soliman et al. | |
| 8,074,715 B2 | 12/2011 | Rispler et al. | |
| 2001/0050172 A1* | 12/2001 | Tolman | E21B 17/203 166/297 |
| 2003/0062166 A1* | 4/2003 | Cheng | C09K 8/74 166/307 |
| 2003/0062167 A1* | 4/2003 | Surjaatmadja | E21B 43/26 166/308.6 |
| 2003/0127230 A1* | 7/2003 | von Eberstein, Jr. | E21B 21/08 166/337 |
| 2005/0269099 A1* | 12/2005 | Stegent | E21B 7/18 166/308.1 |
| 2006/0102344 A1 | 5/2006 | Surjaatmadja et al. | |
| 2006/0185848 A1* | 8/2006 | Surjaatmadja | C09K 8/68 166/280.2 |
| 2006/0201674 A1* | 9/2006 | Soliman | E21B 36/001 166/298 |
| 2013/0306315 A1* | 11/2013 | Kaminsky | E21B 43/267 166/280.1 |
| 2015/0144347 A1 | 5/2015 | Brannon et al. | |

OTHER PUBLICATIONS

Allison et al. "Restimulation of Wells using Biodegradable Particulates as Temporary Diverting Agents," Jan. 1, 2011, Society of Petroleum Engineers. doi:10.2118/149221-MS, 11 pages.

\* cited by examiner

METHOD FOR FRACTURING A FORMATION

BACKGROUND

This section is intended to provide background information to facilitate a better understanding of the various aspects of the described embodiments. Accordingly, it should be understood that these statements are to be read in this light and not as admissions of prior art.

Subterranean formations may contain petroleum, natural gas, or other hydrocarbons, but may have a poor hydrocarbon flow rate due to formation characteristics such as low permeability, or from damage or clogging of the formation during drilling. Low permeability and damage or clogging of the formation is particularly common in tight sands and shale formations, among others.

To increase and/or enhance flow rate, a well drilled within a poor flow rate formation may be stimulated after the well completion. The formation may stimulated by fracturing by injecting a pressurized liquid into the well and perforation tunnels to create cracks in the formations through which natural gas, petroleum, and other hydrocarbons are able to flow more freely. When pressure is removed from the well, proppants (e.g., small grains of sand, aluminum oxide, among others) hold the fractures open allowing hydrocarbons to flow from the formation and into the well (referred to as production). Stimulation techniques include hydraulic fracturing, acidizing, propellant stimulation, nitrogen circulation, gas lift, and combinations thereof, among others.

BRIEF DESCRIPTION OF THE DRAWINGS

For a detailed description of the embodiments of the invention, reference will now be made to the accompanying drawings in which:

FIGS. 4B-4F depict schematic views of recovery scenarios in accordance with one or more embodiments.

DETAILED DESCRIPTION

Figure 1A:
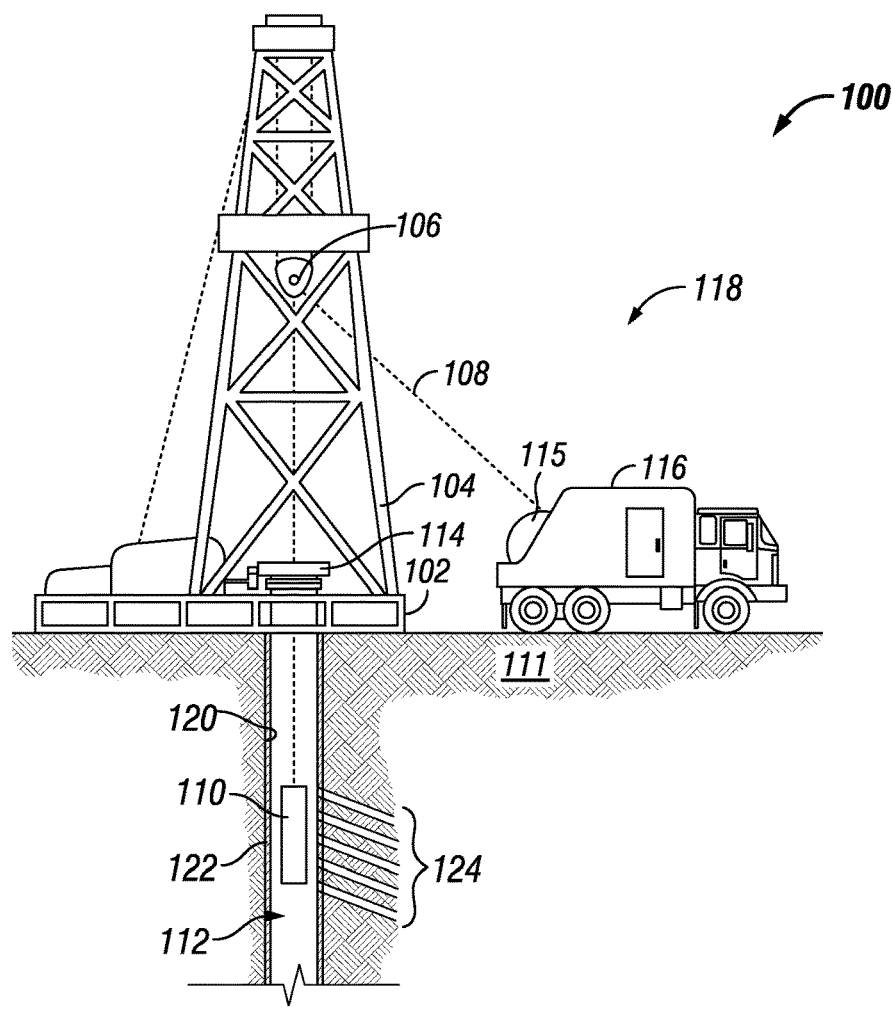
FIGS. 1A-1C depict illustrative fracturing systems in accordance with one or more embodiments.
Figure 1B:
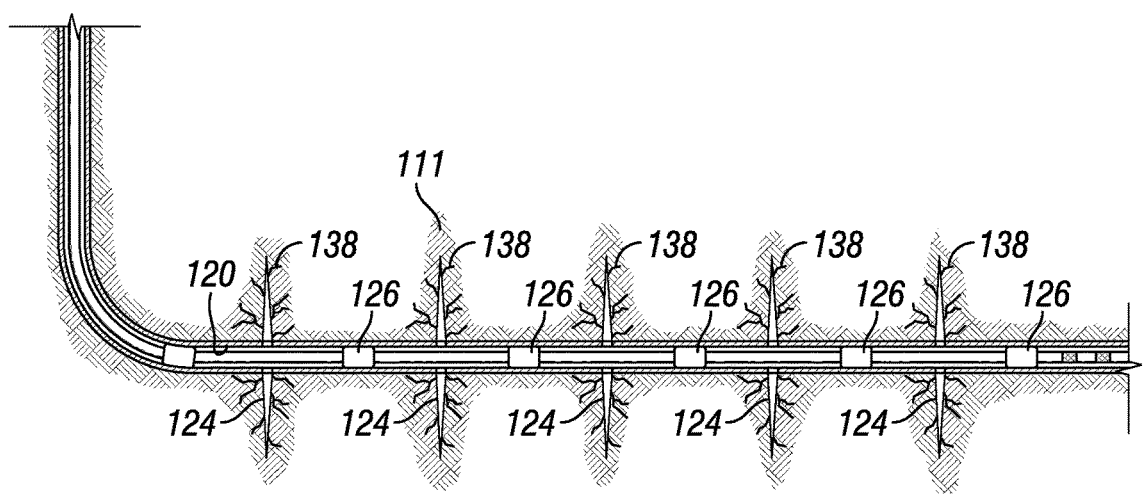
Figure 1C:
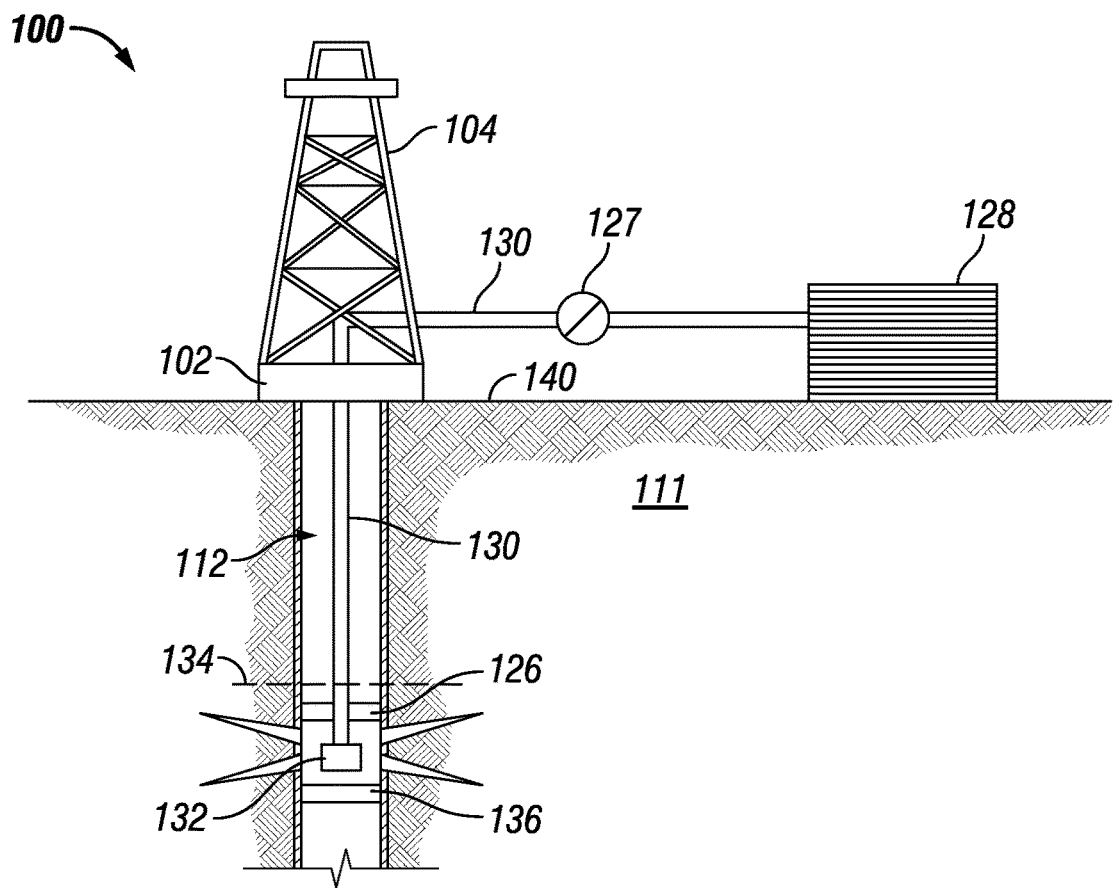

In FIGS. 1A-1C, a schematic view of a fracturing system 100 in accordance with one or more embodiments is shown. A platform 102 is equipped with a derrick 104 that supports a hoist 106. The operation of retractable coiled tubing 108 is performed through the derrick on the platform 102. The coiled tubing 108 suspends a perforation tool 110 within a wellbore 112 that penetrates through formations 111. While coiled tubing is shown, it should be understood that the perforation tool 110 could be conveyed into the wellbore 112 with other types of conveyance such as a downhole tractor, a wireline, rigid pipe (e.g., jointed tubulars), or the like.

The perforation apparatus 110 may be lowered through wellhead 114 using a spool 115 connected to facility 116. The facility 116 may be a mobile facility, such as a vehicle (as shown), may be located remotely, or may be a more permanent structure, such as a standing structure or building. The facility 116 may be used to control the perforation tool 110, the coiled tubing 108, and other equipment and/or operations at the well site 118.

While FIG. 1A depicts a land-based system, it is to be recognized that like systems may also be operated in offshore locations for subsea wells. In addition, although shown as vertical in FIG. 1A, the wellbore 112 may include horizontal, vertical deviating to horizontal (as shown in FIG. 1B), slant, curved, and/or other types of wellbore geometries and orientations.

The wellbore 112 may include casing 120 that is cemented in place or otherwise secured to wellbore wall 122 or a previously hung casing (not shown). In one or more embodiments, the wellbore 112 may not contain any casing, often referred to as an "open hole," or may include one or more cased sections. In cased wells, perforation tunnels 124 may be formed in the casing 120 using perforation tool 110, as shown in FIG. 1B. The perforation tool 110 may include shape charges, a perforating gun, hydro jetting and/or other tools as known in the art.

The perforation tunnels 124 may be formed at one or more locations along the wellbore 112 and the locations may be based on characteristics of the formation 111 (e.g., formation type, density, resistivity, porosity, etc.) surrounding the wellbore 112. In one or more embodiments, the perforation tunnels 124 may be formed at particular intervals and may be separated from one another using one or more packers 126, or other sealing devices (e.g., a plug 136 in FIG. 1C), as shown in FIG. 1B. As will be further discussed, pre-existing perforation tunnels 124 may also be located at one or more locations along the wellbore 112.

The fracturing system 100 is configured to deliver treatment fluid to one or more downhole locations and along the length of the perforation tunnels 124, including both new and existing perforation tunnels. The new and existing perforation tunnels, which may be formed deep into the formation 111, may increase the surface area for the hydrocarbons to flow into the wellbore 112. As shown in FIG. 1C, the fracturing system 100 may include a pump 127 that is fluidly coupled to line 130 which is used to transport the treatment fluid from a mixing/storage tank 128 to the wellbore 112. The treatment fluid enters a given treatment zone 134 in the wellbore 112 using an injection tool 132 connected to the line 130. As used herein, the term "treatment zone" is used to refer to an interval of rock within the formation 111 and along the wellbore 112 into which the treatment fluid is directed to flow.

In one or more embodiments, the pump 127 may be a high pressure pump. As used herein, the term "high pressure pump" refers to a pump that is capable of delivering a fluid downhole at a pressure of about 1000 psi or greater. A high pressure pump may be used when it is desired to introduce the treatment fluid to a target zone at or above a fracture gradient of the subterranean formation, but it may also be used in cases where fracturing is not desired. In one or more embodiments, the high pressure pump may be capable of fluidly conveying particulate matter, such as proppant particulates, into the treatment zone 134. Suitable high pressure pumps will be known to one having ordinary skill in the art and may include, but are not limited to, floating piston pumps and positive displacement pumps.

In one or more embodiments, the pump 127 may be a low pressure pump. As used herein, the term "low pressure pump" refers to a pump that operates at a pressure of about 1000 psi or less. In one or more embodiments, a low pressure pump may be fluidly coupled to a high pressure pump that is fluidly coupled to the line 130. That is, in such embodiments, the low pressure pump may be configured to convey the treatment fluid to the high pressure pump. In such embodiments, the low pressure pump may "step up" the pressure of the treatment fluid before it reaches the high pressure pump.

In one or more embodiments, the mixing/storage tank 128, as shown in FIG. 1C, may be used to formulate the treatment fluid. The treatment fluid may comprise any carrier fluid known in the art such as water, acid, solvents, resins, foam, gas, proppants, and combinations of the foregoing, among others. The treatment fluid may also be formulated offsite and transported to a worksite, in which case the treatment fluid may be introduced to the line 130 via the pump 127 directly from a shipping container (e.g., a truck, a railcar, a barge, or the like) or from a transport pipeline. In either case, the treatment fluid may be drawn into the pump 127, elevated to an appropriate pressure, and then introduced into the wellbore 112 for delivery downhole.

The line 130 may comprise coiled tubing, jointed pipe, and/or other structures that allow fluid to flow into the wellbore 112. The line 130 may further include flow control devices (not shown) that control the flow of fluid from the interior of the line 130 into the treatment zone 134. In one or more embodiments, the line 130 and/or the wellbore 112 may include one or more packers 126 (or other sealing devices) configured to seal an annulus between the line 130 and wellbore 112. The sealing of the annulus may define an interval of the wellbore 112 into which the treatment fluid will be pumped.

It is to be recognized that the system depicted in FIGS. 1A-1C is merely exemplary in nature and that various additional components may be present that have not necessarily been depicted in the interest of clarity. Non-limited additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

When the treatment fluid is introduced into wellbore 212 at a sufficient hydraulic pressure (referred to as fraction initiation pressure), one or more fractures 238 may be created in a new-wellbore (NWB) region 214. Proppant particulates in the treatment fluid may enter the fractures 238 where they may remain after the treatment fluid flows out of the wellbore 212. These proppant particulates may prop open fractures such that fluids flow more freely through the fractures 238 and into the wellbore 212.

Figure 2A:
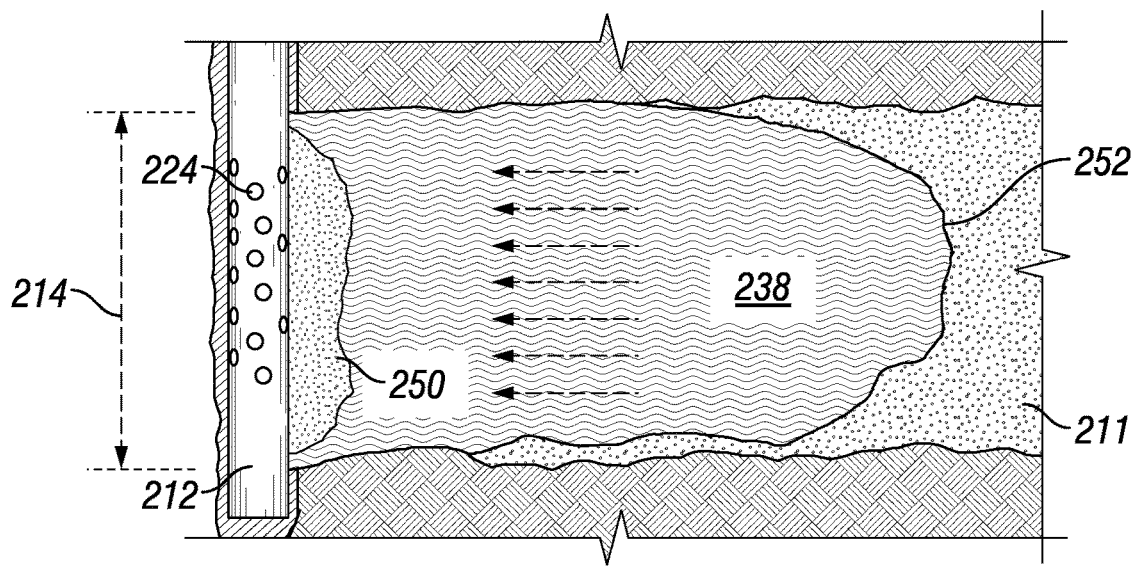
FIGS. 2A-2C depict cross sectional views of fractures in accordance with one or more embodiments.
Figure 2B:
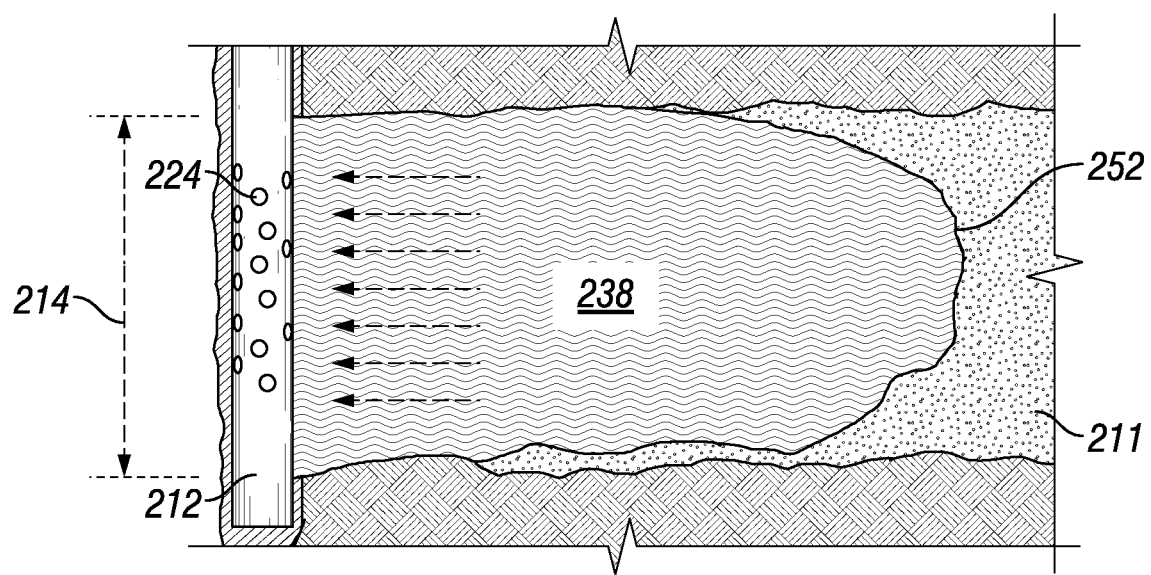

In some cases, the NWB region 214 (the area surrounding the wellbore 212 and extending from the wellbore to a range of about 6 ft. through about 100 ft. into the formation) may be damaged or clogged causing an undesirable pressure drop and/or reduction of hydrocarbon flow into the wellbore 212. For example, as shown in FIG. 2A, crushed proppant material, formation material, and/or combinations of the foregoing may release fines 250 that migrate to the NWB region 214 causing a buildup that restricts flow from the fracture 252 into the wellbore 212. Flow may also be restricted by the flowback of fracturing fluid containing gel residue and/or a buildup of scale in the perforation tunnels 224. In other cases, if the fracture 252 is overflushed, the formation 211 in the NWB region 214 may close up due to a lack of proppant that that region.

Figure 2C:
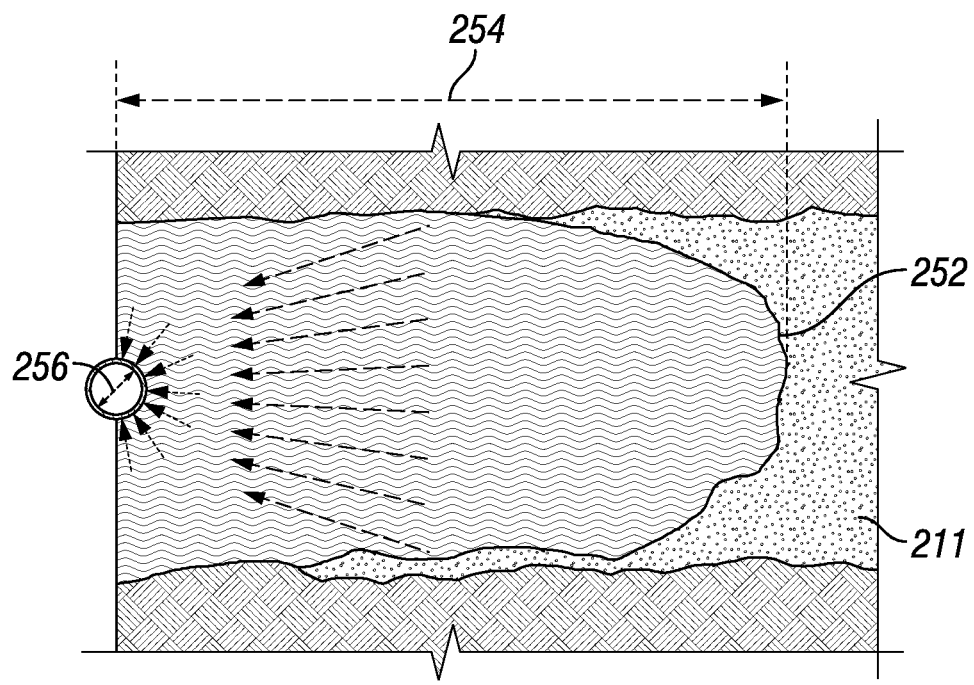

In one or more embodiments, as fluid from the formation 211 enters fracture 252, the fluid flows toward the NWB region of the fracture 252, as shown in FIG. 2A. A fracture height 254 may be greater than 100 ft., but the wellbore diameter 256 the fluid must flow through may be less than 1 ft. (0.3 m), as illustrated in FIG. 2C. As such, the fluid in the fracture 252 converges on the perforation tunnels causing an acceleration of the fluid. This acceleration of fluid is called flow convergence and may cause a pressure drop and reduction in flow from the fracture 252 and into the wellbore 212. If the fluid is carrying fines, and if the fines are higher density than the fluid, the fines may create a logjam and loss of conductivity in the NWB region.

After introduction of treatment fluid to treat the formation 111 and the optional transport of proppant material into the created fracture(s) 138, the wellbore 112 may be shut-in for a period of time sufficient to permit stabilization of the formation 111. In one or more embodiments, the wellbore 112 may be shut-in for a period of time to permit the formation 111 to at least partially close upon the proppant material and stabilize the fracture. The shut-in period can be from several minutes to in excess of about 24 hours and, preferably, is in the range of from about 0.5 to 2 hours. After the treatment zone 134 has stabilized, the wellbore 112 may be opened under controlled conditions and the pressure drop in the wellbore 112 causes the treatment fluid to flow toward the wellbore 112. The treatment fluid then moves from the formation 111 into the wellbore 112 and exits the wellbore 112 at a surface 140 of the formation 111. With proppant material implanted within the formation 111 and surrounding the wellbore 112, hydrocarbons may flow through the fractures 238 and into the wellbore 112, as shown in FIG. 1D.

Under any of these scenarios, if the conductivity between the wellbore 212 and the fracture 252 is damaged, the conductivity of the NWB region may be restored by re-fracturing the NWB region 214 to implant additional proppants and/or divert flow to other intervals in the wellbore 212 having better conductivity.

Figure 3:
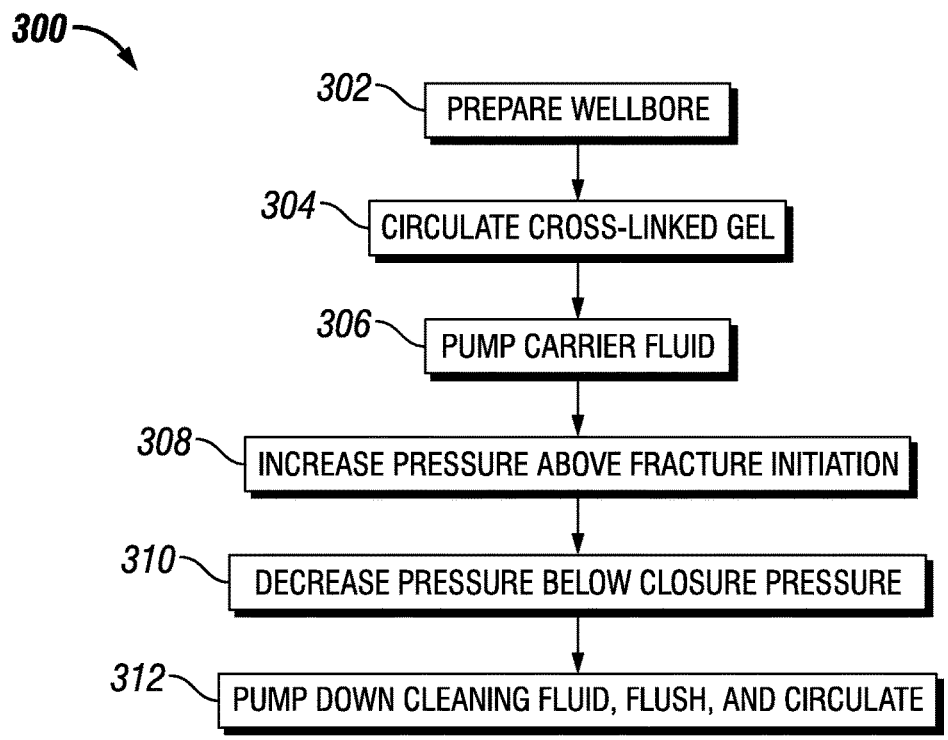
FIG. 3 depicts a flow chart for fracturing a wellbore in accordance with one or more embodiments.

FIG. 3 depicts a flow chart of a method 300 for treating a wellbore in accordance with one or more embodiments. The method 300 includes preparing a wellbore at 302. For example, if the NWB conductivity has been damaged in a wellbore in which an initial or previous fracturing process (e.g., hydraulic fracturing, acidizing, gas lift, etc.) has been performed, the wellbore may be prepared by cleaning the wellbore (e.g., circulating and/or flushing the wellbore with a cleaning fluid) prior to restoring NWB conductivity. On the other hand, if the wellbore has been completed and perforated, but has not yet undergone a fracturing process, the wellbore may be fractured without cleaning.

To clean the wellbore, an injection tool (e.g., injection tool 132 in FIG. 1C) may be run into the wellbore using coiled tubing or other conveyance tools. The injection tool may include any bottom-hole assembly capable of injecting or redirecting fluid flow, for example, a fluidic oscillator. Using the injection tool, fluid is injected into the wellbore and through the perforation tunnels to remove casing fragments, formation materials, scale, paraffin, ashphaltenes and/or other particulates in the wellbore. In one or more embodiments, the fluid may be continually pumped or pulsed and may be designed to dissolve, transport, or otherwise remove particulates from the wellbore that otherwise restrict fluid flow from the formation into and through the wellbore.

As previously described with respect to FIG. 1C, the line 130 may comprise coiled tubing or any other structures to flow a fluid, such as the treatment fluid. In one or more embodiments, the coiled tubing can include fiber optic equipped coiled tubing to perform both injection and production testing in the wellbore. The coiled tubing aids in evaluating the effectiveness of the clean out treatment techniques and to verify the portions of the wellbore that are severely damaged prior to performing a larger scale treatment. The information obtained via the injection and production testing may be used to determine if and where to install new perforations within the wellbore.

Once the wellbore is prepared, a cross-linked fluid (e.g., water containing a gelling agent and a cross-linker such as boron, zirconium, titanium, etc.) may be circulated within the wellbore at 304. The cross-linked fluid may include any fluid (e.g. water), gel (guar gum, methanol, etc.), or foam (e.g., nitrogen, carbon dioxide) known in the art and may include additives such as clay control, buffers, acids, and breakers, scale inhibitors, surfactants among others to improve the fluid performance, as well as, make it compatible with both the formation and the reservoir fluids. The cross-linked fluid may flow through coiled tubing which enters into the wellbore at any location along the wellbore (e.g., at a distal end of the wellbore). The circulation may be controlled or varied over a period of time to provide for injection of the cross-linked fluid into the formation. In one or more embodiments, while pumping at a controlled rate, returned fluid may be choked back at a lower controlled rate on the annulus of the wellbore. In other embodiments, the cross-linked fluid may be injected and pumped out of the wellbore at the same or different rates. For example, circulation of the cross-linked fluid may include a system injected at a specified injection rate and flowback rate.

After circulating the cross-linked fluid for a period of time, a carrier fluid containing proppant and optional particulate diverter (e.g. BioVert®) may be injected into the wellbore at 306. The diverter material includes specially sized particulates that are used to plug an area, for example, plug perforation tunnels and/or fractures at or near the perforation tunnels. Since the diverter is designed to plug, the particle size distributions will often be very wide to enhance the plugging capability. Depending upon the desired purpose of a particular diverter, the particle sizes may range in size, for example, from $6/100$ mesh, $16/100$ mesh, $20/100$ mesh. The diverter material will either dissolve or degrade with time and temperature once placed into the wellbore.

Similar to above, the carrier fluid may flow through coiled tubing which enters into the wellbore. The flow of the carrier fluid may be controlled or varied over a period of time to provide for injection of at least a portion of the carrier fluid into the formation. In one or more embodiments, while pumping carrier fluid at a controlled rate, the returned fluid may be choked back at a lower controlled rate on the annulus of the wellbore. In other embodiments, the carrier fluid may be injected and pumped out of the wellbore at the same or different rates. Other proppant and particulate diverter concentrations may be selected based on wellbore characteristics and formation properties, among others.

Once the carrier fluid reaches the vicinity of the perforations in the wellbore, pressure in the annulus of the wellbore may be increased at 308. In one or more embodiments, the pressure in the annulus of the wellbore may be increased until the annulus pressure exceeds a fracture initiation pressure (i.e., the pressure in which fluid is capable of penetrating into the formation) and the formation may fracture causing carrier fluid and/or cross-linked fluid to flow into the formation. For a period of time, the annulus pressure is held above fracture initiation pressure to allow at least a portion of the cross-linked fluid and carrier fluid to be injected into the NWB region of the wellbore at each of the wellbore intervals and/or perforations.

At predetermined time intervals the pumping rate is reduced in order to decrease the annulus pressure at 310. In one or more embodiments, the annulus pressure may be lowered to below a fracture closure pressure to allow for diversion to other intervals (e.g., from a clogged interval to an unclogged interval).

Thereafter, increasing pressure to above fracture initiation pressure to re-fracture the formation by flowing proppant into the formation and decreasing below fracture closure pressure may be repeated multiple times to enhance NWB conductivity. For example, the control of the annulus pressure (i.e., increasing, decreasing, and/or maintaining annulus pressure) may be performed until a certain amount of proppant is injected in each of the perforated intervals in the wellbore. In one example, 1000 lbs. (453.6 kg) of proppant implanted per perforation may be sufficient in fracturing the wellbore.

In one or more embodiments, once a certain amount of proppant is embedded in each of the perforated intervals in the wellbore, cleaning fluid may be pumped down the wellbore, flushed, and/or circulated in order to recover any remaining proppant and/or diverter within the wellbore and to prepare the wellbore for production. Similar to above, the wellbore may be shut-in for a predetermined time period to allow at least some of the diverter to dissolve or degrade.

Figure 4A:
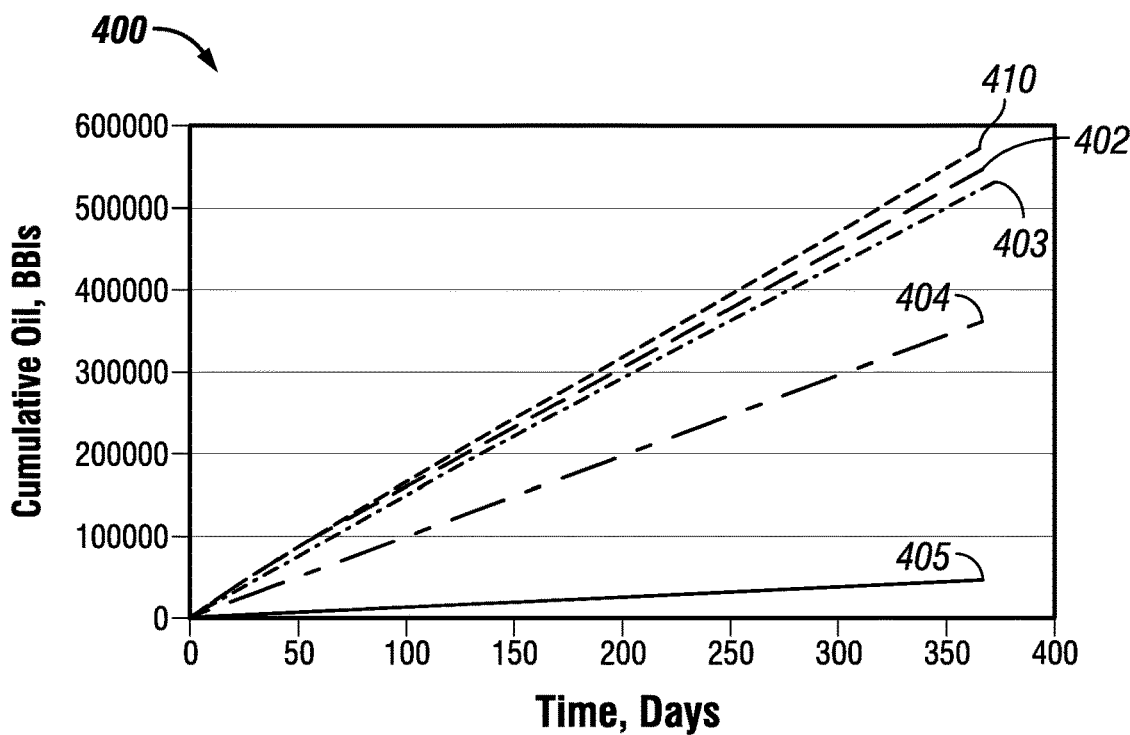
FIG. 4A depicts a plot of example recovery scenarios in accordance with one or more embodiments.

FIG. 4A depicts an example plot of recovered oil as a function of time in accordance with one or more embodiments, while FIGS. 4B-4F depict exemplary scenarios illustrated in the plot of FIG. 4A. In FIG. 4A, plot 400 includes five examples of cumulative hydrocarbon recovery as a function of time (in Days).

Line 402 represents cumulative hydrocarbon production from a downhole scenario 420 having a wellbore 422 with perforations that extend along the wellbore 422, as shown in FIG. 4B. Hydrocarbons flowing from fracture 424 have a fracture conductivity of 10 flow at a rate of approximately 1500 BBls/Day (0.00276 m$^3$/s).

Line 403 represents cumulative hydrocarbon production from a downhole scenario 430 having a wellbore 432 with perforations that extend along the wellbore 432, as shown in FIG. 4C. In this scenario 430, hydrocarbons flowing from fracture 434 have a fracture conductivity of 10 flow at a rate of approximately 1400 BBls/Day (0.00258 m$^3$/s) due to the buildup of fines 436 that migrate toward the NWB region.

Line 404 represents hydrocarbon production from a downhole scenario 440 having a wellbore 442 with perforations that extend along the wellbore 442, as shown in FIG. 4D. Hydrocarbons flowing from fracture 444 have a fracture conductivity of 10 flow at a rate of approximately 1000 BBls/Day (0.00184 m$^3$/s) due to the presence of flow convergence.

Line 405 represents hydrocarbon production from a downhole scenario 450 having a wellbore 452 with perforations that extend along the wellbore 452, as shown in FIG. 4E. Hydrocarbons flowing from fracture 454 have a fracture conductivity of 10 flow at a rate of approximately 150 BBls/Day (0.000276 m$^3$/s) due to flow convergence issues and a buildup of fine 456 that migrate toward the NWB region.

Figure 4F:
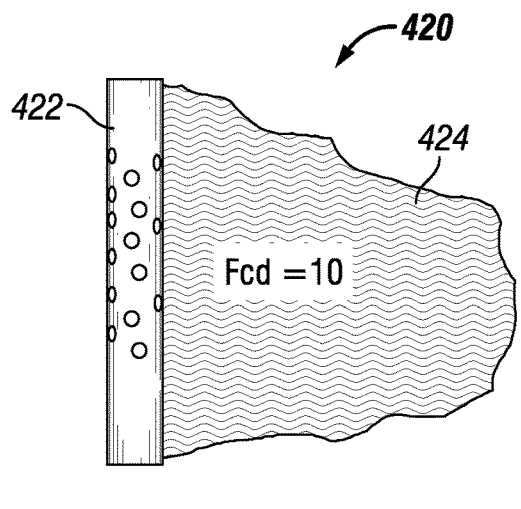
Figure 4F:
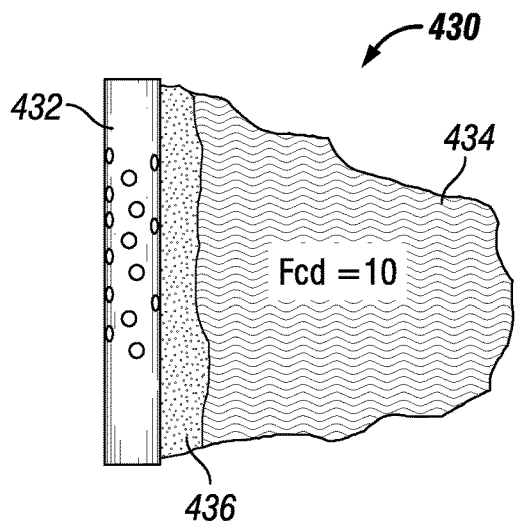
Figure 4F:
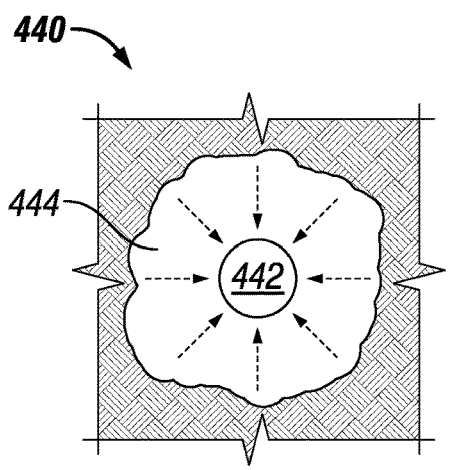
Figure 4F:
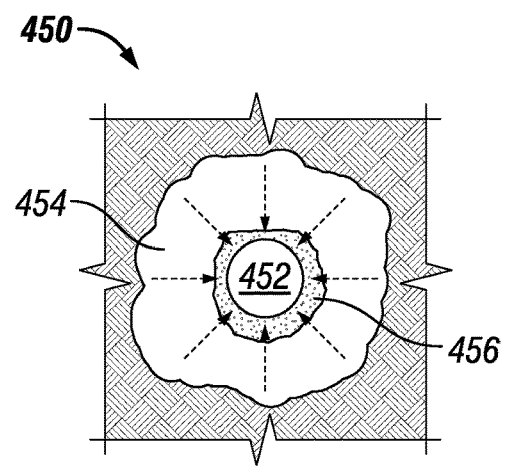
Figure 4F:
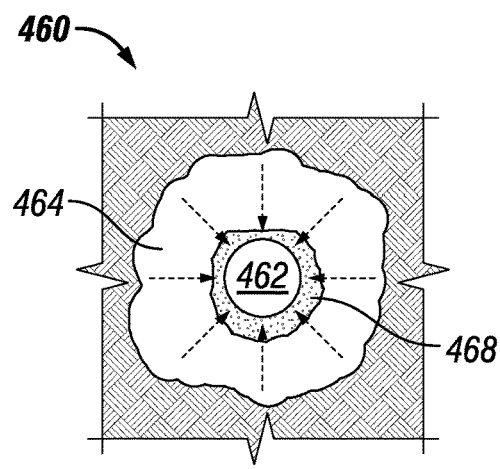

Line 410 represents hydrocarbon production from a downhole scenario 460 having a wellbore 462 with perforations that extend along the wellbore 462, as shown in FIG. 4F. Hydrocarbons flowing from fracture 464 have a fracture conductivity of 10 flow at a rate of approximately 1600 BBls/Day (0.00294 m$^3$/s) due to the restoration of the NWB and a buildup of fine 468 that migrate toward the NWB region in accordance with one or more embodiments.

In one or more embodiments, any of the treatments discussed herein may be augmented by the inclusion of a fiber optic monitor cable installed in the deployment apparatus, or installed in the wellbore itself. This monitor cable may be capable of reporting data to surface real-time to provide information to make on-the-fly adjustments to the treatment, if needed. The data made be stored in a memory log to be evaluated before and after treatment in order to review the effectiveness of the treatment and determine if additional adjustments to present or future operations are needed.

In one or more embodiments, creating short, highly conductive fractures that extend away from the wellbore and connect to the existing proppant bed have the potential of overcoming flow convergence issues and restoring the damaged near wellbore conductivity. In low permeability reservoirs, the amount of proppant necessary for these types of treatments is small (e.g., less than 1000 lbs. (453.6 kg) of proppant) in comparison to performing a full fracturing process.

In addition to the embodiments described above, many examples of specific combinations are within the scope of the disclosure, some of which are detailed below:

Example 1

A method of fracturing a formation penetrated by a wellbore, the method including fracturing the formation by increasing an annulus pressure in the wellbore above a fracture initiation pressure, decreasing the annulus pressure below a fracture closure pressure, and re-fracturing the formation by increasing the annulus pressure in the wellbore above the fracture initiation pressure.

Example 2

The method of Example 1, wherein fracturing the formation further comprises flowing proppant into the formation.

Example 3

The method of Example 2, further comprising decreasing the annulus pressure below the fracture closure pressure after re-fracturing the formation.

Example 4

The method of Example 1, comprising circulating a fluid within the wellbore, wherein the fluid is a cross-linked fluid.

Example 5

The method of Example 4, wherein circulating the fluid comprises circulating a carrier fluid containing at least one of a proppant and a diverter.

Example 6

The method of Example 5, further comprising shutting in the wellbore for a predetermined time for dissolving at least some of the diverter.

Example 7

The method of Example 4, wherein circulating the fluid comprises flowing a fluid through a coiled tubing into the wellbore.

Example 8

The method of Example 4, wherein the cross-linked fluid comprises a 15 to 60 lb/Mgal gel system.

Example 9

The method of Example 5, wherein the carrier fluid comprises a proppant concentration of about 1 ppg to about 4 ppg.

Example 10

The method of Example 5, wherein the carrier fluid comprises a diverter concentration of about 0 ppg to about 2 ppg.

Example 11

The method of Example 1, wherein at least a one of the cross-linked fluid and a carrier fluid is injected at an injection rate of about 8 bpm.

Example 12

The method of Example 11, wherein a flowback rate of at least one of the cross-linked fluid and the carrier fluid is less than the injection rate.

Example 13

The method of Example 1, wherein the fracturing comprising implanting additional proppant or diverting flow of a fluid to improve the conductivity of a new-wellbore (NWB) region located near the wellbore.

Example 14

A method of fracturing a formation penetrated by a wellbore, the method including suspending a perforation tool within the wellbore and perforating casing within the wellbore at given intervals to enhance conductivity between completion tubing and the formation. The method including fracturing the formation by injecting a pressurized fluid into the wellbore and enhancing near-wellbore conductivity by injecting fluid into the wellbore and controlling an annulus pressure where controlling the annulus pressure includes at least one of increasing the annulus pressure above a fracture initiation pressure and decreasing the annulus pressure below a fracture closing pressure.

Example 15

The method of Example 14, wherein suspending the perforation tool comprises conveying the perforation tool in the wellbore using coiled tubing.

Example 16

The method of Example 14, wherein perforating the casing comprises using at least one of a perforation gun, shaped charges, and hydro-jetting.

Example 17

The method of Example 14, wherein injecting fluid into the wellbore comprises injecting fluid comprising a cross-linked gel and a carrier fluid containing at least one of proppant and diverter into the wellbore.

Example 18

The method of Example 17, wherein controlling the annulus pressure comprises varying an injection rate and a flowback rate of the fluid.

Example 19

The method of Example 18, wherein the injection rate is about 8 bpm and the flowback rate is about 2 bpm.

Example 20

The method of Example 14, further including determining where to perforate in the casing in the wellbore, determining where to provide treatment in the wellbore, and verifying the results of the treatment.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method of restoring connectivity to an existing fracture in a formation, the method comprising:
    injecting a cleaning fluid into the formation having the existing fracture at a pressure below a fracture initiation pressure; then
    injecting a cross-linked fluid into the formation having the existing fracture at a pressure below the fracture initiation pressure; then
    injecting a carrier fluid comprising a proppant into the existing fracture at a pressure above the fracture initiation pressure of the formation to restore connectivity to the existing fracture; then
    decreasing the annulus pressure below a fracture closure pressure of the formation; and then
    re-injecting the carrier fluid comprising the proppant into the formation at a pressure above the fracture initiation pressure to increase connectivity to the existing fracture.

2. The method of claim 1, further comprising decreasing the annulus pressure below the fracture closure pressure after re-injecting the carrier fluid.

3. The method of claim 1, comprising circulating the cross-linked fluid within the wellbore.

4. The method of claim 3, wherein circulating the cross-linked fluid comprises flowing the cross-linked fluid through a coiled tubing into the wellbore.

5. The method of claim 3, wherein the cross-linked fluid comprises a 15 to 60 lb/Mgal gel system.

6. The method of claim 1, further comprising circulating the carrier fluid within the wellbore.

7. The method of claim 6, wherein the carrier fluid further comprises a diverter and the method further comprises shutting in the wellbore for a predetermined time for dissolving at least some of the diverter.

8. The method of claim 7, wherein the carrier fluid comprises a concentration of the diverter of 0.1 ppg to 2 ppg.

9. The method of claim 6, wherein the carrier fluid comprises a concentration of the proppant of 1 ppg to 4 ppg.

10. The method of claim 1, wherein at least one of the cross-linked fluid or the carrier fluid is injected at an injection rate of about 8 bpm.

11. The method of claim 10, wherein a flowback rate of at least one of the cross-linked fluid or the carrier fluid is less than the injection rate.

12. The method of claim 1, wherein injecting the carrier fluid comprises implanting additional proppant or diverting flow of a fluid to improve conductivity to the existing fracture.

13. A method of restoring connectivity to an existing fracture in a formation, the method comprising:
    suspending an injection tool within a wellbore adjacent the existing fracture; then
    injecting a cleaning fluid into the formation at a pressure below a fracture initiation pressure; then
    injecting a cross-linked fluid into the formation at a pressure below the fracture initiation pressure;
    injecting a pressurized fluid comprising a first proppant into the wellbore to restore connectivity to the existing fracture at a pressure above the fracture initiation pressure; then
    decreasing an annulus pressure below a fracture closing pressure; then re-injecting the pressurized fluid into the wellbore and controlling the annulus pressure to increase connectivity to the existing fracture;

and wherein controlling the annulus pressure comprises at least one of increasing the annulus pressure above the fracture initiation pressure and decreasing the annulus pressure below the fracture closing pressure.

14. The method of claim 13, wherein suspending the injection tool comprises conveying the injection tool in the wellbore using coiled tubing.

15. The method of claim 13, wherein the pressurized fluid further comprises a diverter.

16. The method of claim 15, wherein controlling the annulus pressure comprises varying an injection rate and a flowback rate of the pressurized fluid.

17. The method of claim 16, wherein the injection rate is 8 bpm and the flowback rate is 2 bpm.

18. The method of claim 13, further comprising determining if the existing fracture is damaged, clogged, or overflushed.

* * * * *